United States Patent [19]

Au

[11] Patent Number: 4,885,457
[45] Date of Patent: Dec. 5, 1989

[54] METHOD OF MAKING A CONDUCTIVE POLYMER SHEET

[75] Inventor: Andrew N. Au, Fremont, Calif.

[73] Assignees: Raychem Corporation, Menlo Park, Calif.;

[21] Appl. No.: 252,229

[22] Filed: Sep. 30, 1988

[51] Int. Cl.⁴ ............................................. H05B 3/34
[52] U.S. Cl. .................................. 219/548; 219/528; 219/538; 219/505; 219/553; 264/146; 264/148
[58] Field of Search ............... 219/548, 528, 538, 504, 219/505, 553, 549; 264/104, 105, 209.3, 211, 148, 146

[56] References Cited

U.S. PATENT DOCUMENTS

| | | | |
|---|---|---|---|
| 4,003,973 | 1/1977 | Kurokawa | 264/146 |
| 4,049,768 | 9/1977 | Luthra | 264/209.3 |
| 4,062,712 | 12/1977 | Stark | 246/146 |
| 4,459,473 | 7/1984 | Kamath | 219/553 |
| 4,719,335 | 1/1988 | Batliwalla et al. | 219/528 |
| 4,761,541 | 8/1988 | Batliwalla et al. | 219/528 |
| 4,777,351 | 10/1988 | Batliwalla et al. | 219/528 |

Primary Examiner—A. D. Pellinen
Assistant Examiner—Leon K. Fuller
Attorney, Agent, or Firm—Marguerite E. Gerstner; Timothy H. Richardson; Herbert G. Burkard

[57] ABSTRACT

A method of making a conductive polymer sheet in which a hollow conductive polymer extrudate is slit and flattened. The resulting sheet may have improved resistivity uniformity over conventionally extruded sheet. The sheet is useful in producing electrical devices such as heaters and circuit protection devices.

32 Claims, 3 Drawing Sheets

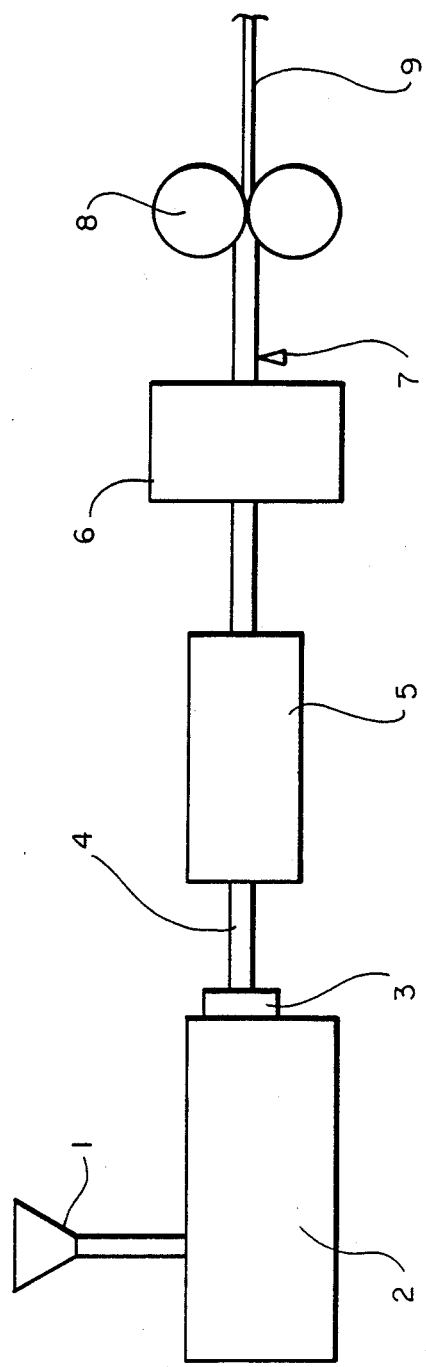
FIG_1

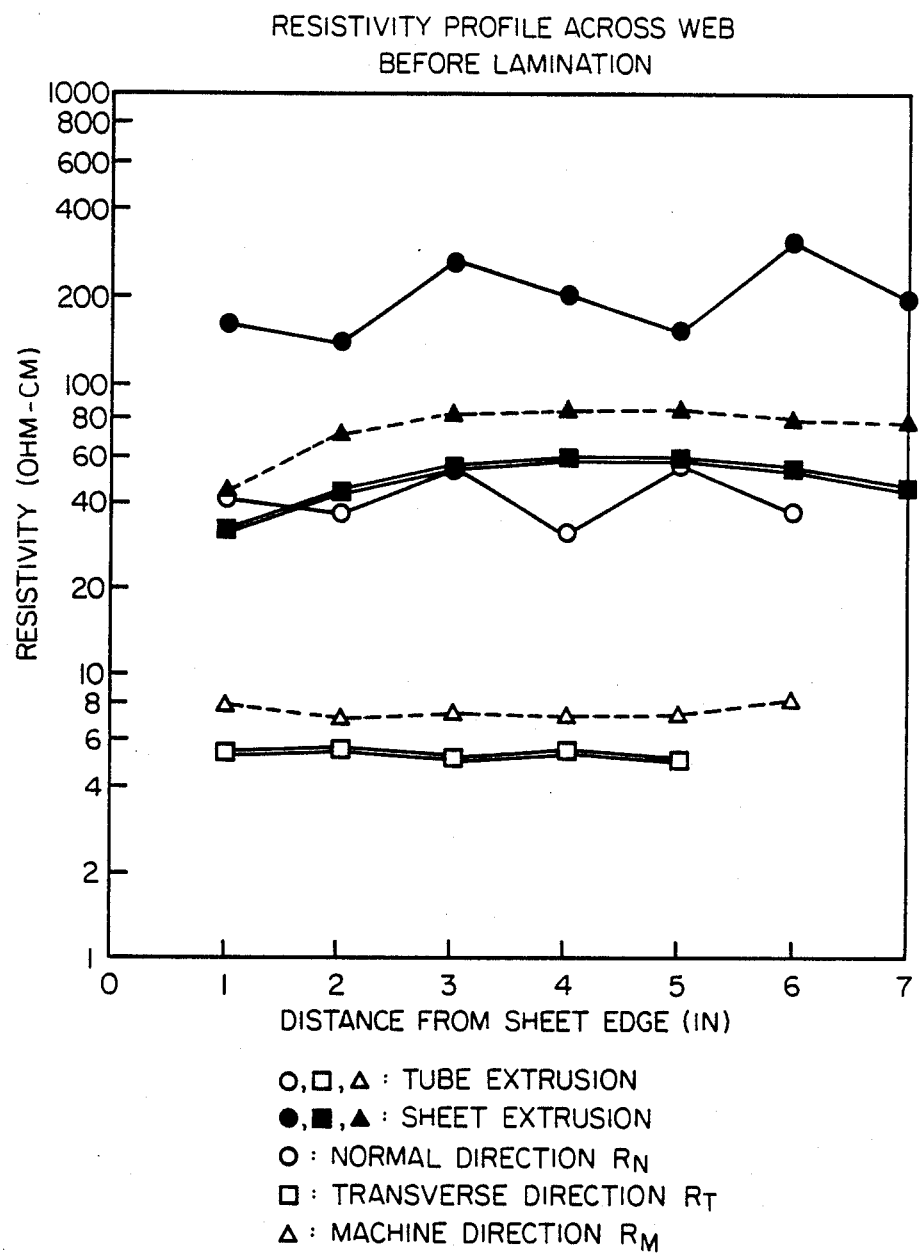
FIG_2

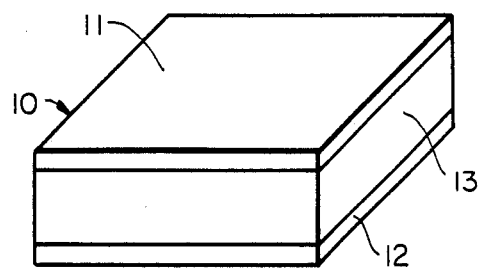
FIG_3
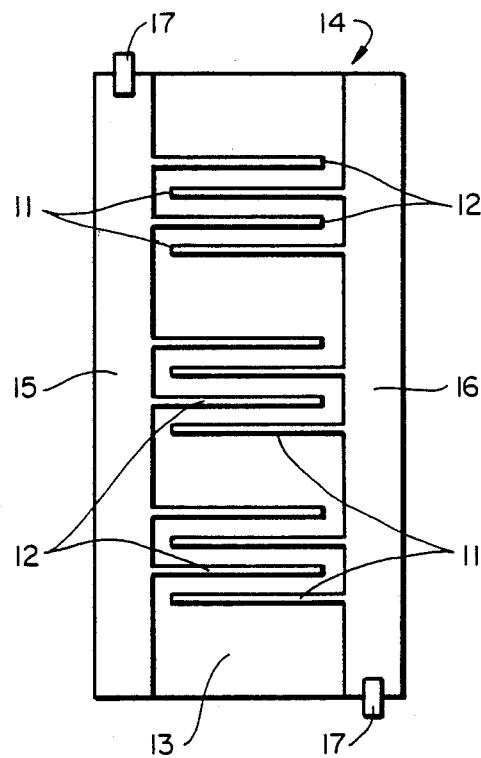
FIG_4

METHOD OF MAKING A CONDUCTIVE POLYMER SHEET

FIELD OF THE INVENTION

This invention relates to methods of making articles comprising conductive polymer compositions.

BACKGROUND OF THE INVENTION

Conductive polymer compositions and electrical devices comprising them are well-known. Reference may be made, for example, to U.S. Pat. Nos. 4,177,376, 4,459,473, 4,719,335, 4,722,758, and 4,761,541, and copending, commonly assigned application Ser. Nos. now abandoned, 53,610, filed May 20, 1987 (Batliwalla, et al.) now U.S. Pat. No. 4,777,351, 75,929 filed Jul. 21, 1987 (Barma, et al.), 89,093 filed Aug. 25, 1987 (Kleiner et al.), 189,938 (Friel filed May 3, 1988, 202,165, (Oswal, et al.) filed Jun. 3, 1988, 202,762 (Sherman, et al.) filed Jun. 3, 1988, 247,059 (MP1271, Shafe et al.) filed Sep. 20, 1988, 247,026 (MP1272, Shafe et al.) filed Sep. 20, 1988, 252,237 (MP1247, Newman) filed contemporaneously with this application, International Application Ser. No. PCT/US88/02484 (Barma et al.) filed Jul. 21, 1988, the disclosures of which are incorporated herein by reference.

The resistivity of the conductive polymer composition comprising an electrical device is important in determining the operating characteristics of the device, e.g. the resistance of the device and the power density when connected to a suitable source of electrical power. The resistivity is primarily a function of the content and resistivity of the conductive filler which is incorporated into the conductive polymer composition, but it may be affected by processing conditions, e.g. the method of compounding, type of additives, or level of irradiation. When an article is prepared from the conductive polymer composition by melt-forming (e.g. extrusion or injection molding), the conditions of the melt-forming process may be an important factor in determining the resistivity of the article and the resulting electrical performance.

It is known that the resistance uniformity of a strip of melt-extruded conductive polymer is greater in the direction of extrusion of the strip (i.e. the "machine" direction) than it is in either of the perpendicular (i.e. the "transverse" and "normal") directions. In conventional conductive polymer heaters, the principal direction of current flow through the conductive polymer is in the transverse direction (for strip heaters) or the normal direction (for laminar heaters). Because resistance uniformity results in improved power output, voltage stability, and thermal profile, it is desirable that the predominant direction of current flow be in the direction of greatest resistance uniformity. This may be particularly difficult to achieve for heaters in which the resistivity of the conductive polymer composition is very high. For such materials, small variations in filler concentration often result in large differences in resistivity and corresponding large variations in resistance uniformity. For laminar sheet heaters, traditional extrusion dies have produced extruded sheet in which the orientation is inherently nonuniform due to the unequal residence time of the polymer melt at the center and edges of the sheet. Such dies have required a plurality of cartridge heaters inserted at the lip of the die. Non-uniform heating of these cartridges has resulted in hot- and cold-spots in the die, producing non-uniform resistances. In addition, differential shear and non-uniform melt-viscosity across the die have contributed to non-uniform resistances. It is common to cut the edges off the extruded sheet produced with "coat hanger" design dies in order to eliminate the resistance variations at the edges due to shear and inconsistent flow.

Various heater geometries have been proposed to maximize the current flow in the direction of highest resistance uniformity. U.S. Pat. No. 4,459,473 (Kamath) discloses a strip heater in which an elongate resistive heating strip is in electrical contact alternately with a first and then a second spaced-apart elongate conductor. In a preferred embodiment, the conductive polymer heating strip is helically wrapped around the conductors and the current flows the length of the heating strip in the direction of extrusion. U.S. Pat. Nos. 4,719,335 and 4,761,541 (both Batliwalla et al.) and copending commonly assigned application Ser. No. 53,610 (Batliwalla et al.) now U.S. Pat. No. 4,777,351 disclose laminar heaters comprising interdigitated electrodes. In these heaters, the current flows parallel to the surface of the laminar conductive polymer element, preferably in the machine direction to optimize stability.

SUMMARY OF THE INVENTION

I have now found that laminar conductive polymer elements with excellent resistance uniformity across the width of the sheet can be prepared through the use of a tubing or blown film extrusion technique. Thus, in a first aspect, the invention comprises a method of making a conductive polymer sheet, which method comprises (1) melt extruding a conductive polymer composition through a die to produce a hollow extrudate;

(2) slitting the extrudate axially (i.e. in the machine direction) to form a sheet.

In a second aspect, the invention comprises an electrical device prepared by the method of the first aspect.

BRIEF DESCRIPTION OF THE DRAWING

FIG. 1 shows a schematic drawing of the process of the invention;

FIG. 2 shows a graph of the resistivity as a function of distance across a conductive polymer sheet made by the method of the invention.

FIG. 3 shows a perspective view of an electrical device made in accordance with the method of the invention; and FIG. 4 shows a plan view of a heater made in accordance with the method of the invention.

DETAILED DESCRIPTION OF THE INVENTION

The method of the invention relates to the melt-forming of a conductive polymer to produce a hollow extrudate, e.g. in the shape of a tube, followed by axially slitting the extrudate in the machine direction to form a sheet. Melt-forming is accomplished by a process which comprises the extrusion of the conductive polymer composition through a suitable tube die. The dimensions of the resulting tube are dependent on the tooling used, the properties of the conductive polymer composition, the volume of air used to support the tube, and other extrusion variables such as draw rate and extrusion speed. The extrudate usually has a circular cross-section, although other shapes, e.g. elliptical or rectangular, can be made. Although tubes with an outer diameter of almost any dimension, e.g. up to 20 inches, can be made, for most applications the tube diameter is 0.5 to 10 inches, preferably 1 to 5 inches, particularly 2 to 4 inches. The air blown through the tube serves to support the structure and to cool it, and also contributes to radial orientation depending on the size of the air bubble. For a typical 2 inch diameter tube, a common air pressure corresponds to 0.2 to 0.5 inch water. The tube is slit at least once in the machine direction to produce an element which is normally passed through rollers (which may be heated or cooled) to flatten it. The resulting sheet has a thickness t, a length p measured in the machine direction of the extrusion, and a width w measured in the transverse direction at right angles to the direction of extrusion, where w corresponds generally to the circumference of the tube, c, or to that fraction c/x, where x is the number of slits made lengthwise through the tube. When multiple slits are made at irregular intervals, the width of each sheet may not be equal.

When it is desirable to produce a thin, wide sheet, blown-film apparatus may be used to form the conductive polymer composition into a tube.

The conductive polymer is composed of a polymeric component, and, dispersed in the polymeric component, a particulate conductive filler. The polymeric component is preferably a crystalline organic polymer. Suitable crystalline polymers include polymers of one or more olefins, particularly polyethylene; copolymers of at least one olefin and and at least one monomer copolymerisable therewith such as ethylene/acrylic acid, ethylene/ethyl acrylate, and ethylene/vinyl acetate copolymers; melt-shapeable fluoropolymers such as polyvinylidene fluoride and ethylene/tetrafluoroethylene copolymers; and blends of two or more such polymers. For some applications it may be desirable to blend one crystalline polymer with another polymer in order to achieve specific physical or thermal properties, e.g. flexibility or maximum exposure temperature. Other polymers which may be used include amorphous thermoplastic polymers such as polycarbonate or polystyrene and elastomers such as polybutadiene or ethylene/propylene/diene (EPDM) polymer.

The particulate conductive filler may be carbon black, graphite, metal, metal oxide, or a combination of these. In some applications, the particulate filler may itself be composed of a polymer matrix in which is dispersed a particulate conductive filler. Examples of this type of conductive polymer composition are found in Application Ser. Nos. 818,846 (Barma) now abandoned, 75,929 (Barma et al.), and International Application No. PCT/US88/02484 (Barma et al.). The type and aspect ratio of the particulate conductive filler may affect the resistance uniformity of the sheet.

The conductive polymer composition may comprise antioxidants, inert fillers, prorads, stabilizers, dispersing agents, or other components. Dispersion of the conductive filler and other components may be achieved by melt-processing or solvent mixing prior to the extrusion step. Alternatively, the components of the conductive polymer composition may be dry-blended and the mixing and extrusion steps may be conducted in-line.

The conductive polymer compositions used in the conductive polymer element may exhibit PTC (positive temperature coefficient) behavior or ZTC (zero temperature coefficient) behavior in the temperature range of interest when connected to a source of electrical power. The terms "PTC behavior" and "composition exhibiting PTC behavior" are used in this specification to denote a composition which has an $R_{14}$ value of at least 2.5 or an $R_{100}$ value of at least 10, and preferably both, and particularly one which has an $R_{30}$ value of at least 6, where $R_{14}$ is the ratio of the resistivities at the end and the beginning of a 14° C. range, $R_{100}$ is the ratio of the resistivities at the end and the beginning of a 100° C. range, and $R_{30}$ is the ratio of the resistivities at the end and the beginning of a 30° C. range. In contrast, "ZTC behavior" is used to denote a composition which increases in resistivity by less than 6 times, preferably less than 2 times in any 30° C. temperature range within the operating range of the heater.

When the conductive polymer sheet made by the method of the invention is divided into a plurality of components, each component can, by the attachment of suitable electrodes, be used to produce a variety of electrical devices depending on the resistivity of the conductive polymer composition and the geometry of the component. Of particular interest are heaters and circuit protection devices. Although the required resistivity is dependent on the source of electrical power, the geometry of the electrical device, and the configuration of the electrodes, compositions suitable for producing sheet to be used in heaters generally have a resistivity of at least 100 ohm-cm, preferably at least 1000 ohm-cm, particularly at least 10,000 ohm-cm. The method of the invention allows production of sheets having uniform high resistivity, e.g. 10,000–50,000 ohm-cm. The compositions suitable for circuit protection devices generally have a resistivity less than 100 ohm-cm. These compositions, which are frequently brittle due to high filler content, can be extruded to produce thin sheets, e.g. less than 0.020 inch, by the method of the invention. In general, current protection devices have a surface area of less than 2.0 in$^2$, preferably less than 1.5 in$^2$, particularly less than 1.0 in$^2$. The surface area of a heater is generally at least 2 in$^2$, preferably 5 in$^2$, particularly at least 10 in$^2$, e.g. 20 to 100 in$^2$. For purposes of this specification, "surface area" is defined as the total area of the two surfaces of the laminar device having the largest dimensions. For devices in which the current flow is through the thickness of the sheet, the surface area is two times the area of the length times the width of the device.

An object of the method of this invention is to produce a conductive polymer sheet with improved resistivity uniformity. In this specification, the term "sheet resisitivity", $R_r$, is used to mean the resistivity calculated from the resistance measured for the entire sheet. When electrodes are positioned so that the resistance is measured along the length of the sheet, $R_r$ equals the resistivity of the machine direction, $R_m$. When electrodes are positioned so that the resistance is measured across the width of the sheet in the transverse direction and at right angles to the machine direction, $R_r$ equals the resistivity of the transverse direction, $R_t$. When electrodes are positioned so that the resistance is measured through the thickness of the sheet, $R_r$ equals the resistivity of the normal direction, $R_n$. The resistivity uniformity of the extruded sheet in the machine or transverse direction can be determined by comparing the resistivity of individual segments, $R_s$, cut to allow measurement of resistance in the desired direction with the sheet resistivity of that direction. The individual segments are cut to produce equal segments whose width is the smaller of (a) 0.2 times the dimension of interest of the sheet of length p inches and width w inches and (b) as close to 1 inch as division into equal segments will allow (referred to hereafter as approximately 1 inch). Thus, the uniformity in the machine direction is determined by dividing the sheet into the smaller of 0.2p or approximately 1 inch segments by cutting the sheet at right angles to the machine direction (i.e. parallel to the transverse direction) into transverse segments, measuring the resistance across the width of each segment (i.e. in the machine direction), and calculating the resistivity of each segment, $R_{sm}$. The uniformity in the transverse direction is determined by dividing the sheet into the smaller of 0.2w or approximately 1 inch segments by cutting the sheet parallel to the machine direction into longitudinal segments, measuring the resistance in the transverse direction, and calculating the resistivity of each segment, $R_{st}$. For most sheet prepared by the method of the invention, the resistivity of each segment, $R_s$, is from 0.7 $R_r$ to 1.3 $R_r$, preferably from 0.8 $R_r$ to 1.2 $R_r$, particularly from 0.85 $R_r$ to 1.15 $R_r$. For measurements of the machine direction, $R_r$ equals $R_m$ and $R_s$ equals $R_{sm}$. For measurements of the transverse direction, $R_r$ equals $R_t$ and $R_s$ equals $R_{st}$.

One advantage of this method is that the resistivity of the conductive polymer sheet in the normal direction is generally at least 2 times, preferably at least 5 times, particularly least 10 times, the resistivity in the machine or transverse directions. This is particularly useful in producing extruded sheet for use in laminar sheet heaters in which the electrodes are configured such that the predominant direction of current flow is through the thickness of the conductive polymer sheet. By using this method to produce sheet it is possible to use a conductive polymer composition which has a lower resistivity than that necessary using conventional extrusion techniques. This is advantageous because it is generally easier to consistently make low resistivity compounds than high resistivity compounds due to the problems (e.g. sensitivity to mixing conditions, weigh-up errors) associated with low loadings of conductive filler. Like the sheet, the components prepared from the sheet can also be evaluated for resistivity values (e.g. $R_m$, $R_t$, $R_n$) and resistivity uniformity.

The invention is illustrated by the drawing in which FIG. 1 shows a schematic of the process of the invention. The conductive polymer composition 1 is inserted into an extruder 2 and extruded through die 3 to produce a hollow tube 4. Air is injected into the tube 4 which is cooled as it passes through sizing box 5 and is taken up by apparatus which may be rollers 6. A knife 7 or other means for cutting slits the tube, which, as it passes between rollers 8 is flattened into sheet 9 either by heat or pressure or a combination of the two.

FIG. 2 shows the effect on both resistivity and the uniformity of resistivity of conductive polymer sheets prepared by a tube extrusion of the invention (open symbols) and a convention sheet extrusion (solid symbols). It is apparent that for the same conductive polymer composition the resistivity of the tube extrusion is approximately 10 times lower than that of the sheet extrusion.

FIG. 3 shows an electrical device 10, e.g. a circuit protection device or a heater, made in accordance with the method of the invention. Two metal electrodes 11, 12 are attached to opposite sides of a laminar conductive polymer component 13. The conductive polymer component 13 is prepared from conductive polymer sheet 9 shown in FIG. 1.

FIG. 4 shows a heater 14. Three discrete heating regions are present in which two interdigitated electrodes 11, 12 are attached to a conductive polymer sheet 13. Electrical connection is made to each electrode and from one discrete region to the next by means of buss-bars 15, 16. Crimps 17 serve to allow connection to a source of electrical power.

The invention is illustrated by the following examples.

EXAMPLE 1

Pellets of conductive polymer were made by mixing 55% by weight ethylene/acrylic acid copolymer (Primacor 1320 with 6.5% acrylic acid, available from Dow Chemical) with 45% by weight carbon black (Statex G, available from Columbian Chemicals). The tumble-blended dry ingredients were fed into a Farrell continuous mixer at a constant rate and were then extruded into pellets through a 2 inch (5 cm) extruder. A 2-inch diameter (5.08 cm) tube with a wall thickness of 0.010 inch (0.025 cm) was produced by extruding the pellets though a tube die with an outer diameter of 3.17 inch (8.05 cm) and drawing the tube through a water-cooled vacuum sizing box (Gatto box) positioned 2 inches (5.08 cm) from the die. The tube was then slit and passed over rollers heated to 60° C. in order to flatten the sheet and minimize curling. The resulting sheet was approximately 6 inch (15.2 cm) wide.

Samples were cut from the sheet and silver paint electrodes (Electrodag 504, available from Acheson Colloids) were positioned on the samples so that the resistance could be measured parallel to the direction of extrusion (i.e. in the "machine direction"), perpendicular to the direction of extrusion (i.e. the "transverse direction"), and through the thickness of the sheet (i.e. the "normal direction"). The results are reported in Table I under the heading "Tube Extrusion". The resistance uniformity across the sheet was determined by cutting 1 by 1 inch (2.5 by 2.5 cm) samples from one edge of the sheet to the other. The resistivity was calculated and the machine, transverse, and normal direction measurements were plotted as a function of the distance from the sheet edge. The results are shown in FIG. 2.

Tensile and elongation properties of the sheet were measured using an Instron at 25° C. Thermal data were generated using a differential scanning calorimeter (DSC). For each sample, a first heating cycle was measured at 10° C./min., followed by a first cooling cycle at 20° C./min. and a second heating cycle at 10° C./min. The melting point was defined as the peak of the melting curve on each cycle. The heat of fusion was a measure of the level of crystallinity for each sample.

EXAMPLE 2

Using a 2 inch (5 cm) extruder, conductive pellets as described in Example 1 were extruded through a 10 inch (25.4 cm) sheet die to produce a sheet with a thickness of approximately 0.020 inch (0.05 cm) and a width of approximately 8 inches (20.3 cm). Using the procedures previously described, the resistances and resistance uniformity were measured. The results are reported in Table I under the heading "Sheet Extrusion" and by the solid symbols in FIG. 1.

TABLE I

|  | Tube Extrusion | Sheet Extrusion |
|---|---|---|
| Resistivity (ohm-cm) | | |

TABLE I-continued

|  | Tube Extrusion | Sheet Extrusion |
| --- | --- | --- |
| Machine direction | 19.3 | 1805.1 |
| Transverse direction | 16.5 | 1320.5 |
| Normal direction | 104.2 | 1745.5 |
| Tensile (psi) | | |
| Machine direction | 3308 | 2790 |
| Transverse direction | 2474 | 2773 |
| Elongation (%) | | |
| Machine direction | 120 | 124 |
| Transverse direction | 118 | 126 |
| Melting Point (°C.) | | |
| First cycle | 100.65 | 101.40 |
| Second cycle | 101.83 | 102.67 |
| Heat of fusion (w/g) | | |
| First cycle | 0.504 | 0.484 |
| Second cycle | 0.901 | 0.866 |

What is claimed is:

1. A method of making a conductive polymer sheet, which method comprises
   (1) melt-extruding a conductive polymer composition through a die to produce a hollow extrudate; and
   (2) slitting the extrudate axially to form a sheet, wherein the sheet has a length p measured in the machine direction of extrusion where the machine direction is the direction parallel to the extrusion direction, a width w measured in the transverse direction at right angles to the direction of extrusion, and a thickness t, and if the sheet is divided at right angles to the machine direction into equal transverse segments, each transverse segment having a width equal to the smaller of (a) 0.2p and (b) as close to 1 inch as division into equal segments will allow, the resistivity measured in the machine direction of each transverse segment is from 0.7 $R_m$ to 1.3 $R_m$, where $R_m$ is the resistivity in the machine direction of the sheet.

2. A method according to claim 1 wherein the resistivity measured in the machine direction of each transverse segment is from 0.8 $R_m$ to 1.2 $R_m$.

3. A method according to claim 1 wherein the resistivity of the sheet in the normal direction, $R_n$, is at least 2 times the resistivity of the sheet in the machine direction, $R_m$.

4. A method according to claim 3 wherein $R_n$ is at least 5 times $R_m$.

5. A method according to claim 4 wherein $R_n$ is at least 10 times $R_m$.

6. A method of making a conductive polymer sheet, which method comprises
   (1) melt-extruding a conductive polymer composition through a die to produce a hollow extrudate; and
   (2) slitting the extrudate axially to form a sheet, wherein the sheet has a length p measured in the machine direction of extrusion where the machine direction is the direction parallel to the extrusion direction, a width w measured in the transverse direction at right angles to the direction of extrusion, and a thickness t, and if the sheet is divided in the machine direction into equal longitudinal segments, each segment having a width equal to the smaller of (a) 0.2w and (b) as close to 1 inch as division into equal segments will allow, the resistivity measured in the transverse direction of each longitudinal segment is from 0.7 $R_t$ to 1.3 $R_t$, where $R_t$ is the resistivity in the transverse direction of the sheet.

7. A method according to claim 6 wherein the resistivity measured in the transverse direction of each longitudinal segment is from 0.8 $R_t$ to 1.2 $R_t$.

8. A method according to claim 6 wherein the resistivity of the sheet in the normal direction, $R_n$, is at least 2 times the resistivity of the sheet in the machine direction, $R_m$.

9. A method according to claim 8 wherein $R_n$ is at least 5 times $R_m$.

10. A method according to claim 9 wherein $R_n$ is at least 10 times $R_m$.

11. An electrical device which comprises
    (1) a conductive polymer component which has been prepared by a method which comprises
        (a) melt-extruding a conductive polymer composition through a die to produce a hollow extrudate,
        (b) slitting the extrudate axially to form a sheet, and
        (c) dividing the sheet into a plurality of components; and
    (2) at least two electrodes which can be connected to a source of electrical power to cause current to flow through the component,
    wherein the component has a length p measured in the machine direction of extrusion where the machine direction is the direction parallel to the extrusion direction, a width w measured in the transverse direction at right angles to the direction of extrusion, and a thickness t, and if the component is divided at right angles to the machine direction into equal transverse segments, each transverse segment having a width equal to the smaller of (a) 0.2p and (b) as close to 1 inch as division into equal segments will allow, the resistivity measured in the machine direction of each transverse segment is from 0.7 $R_m$ to 1.3 $R_m$, where $R_m$ is the resistivity in the machine direction of the component.

12. A device according to claim 11 wherein the conductive polymeric component exhibits PTC behavior.

13. A device according to claim 12 wherein the device is a heater which has a surface area of at least 2 in².

14. A device according to claim 13 wherein the heater has a surface area of at least 5 in².

15. A device according to claim 13 wherein the conductive polymer composition has a resistivity of at least 100 ohm-cm.

16. A device according to claim 15 wherein the conductive polymer composition has a resistivity of at least 1000 ohm-cm.

17. A device according to claim 16 wherein the conductive polymer composition has a resistivity of at least 10,000 ohm-cm.

18. A device according to claim 11 wherein the device is a circuit protection device which has a surface area of less than 2 in².

19. A device according to claim 11 wherein the resistivity of the component in the normal direction, $R_n$, is at least 2 times the resistivity in the machine direction, $R_m$.

20. A device according to claim 19 wherein $R_n$ is at least 5 times $R_m$.

21. A device according to claim 19 wherein $R_n$ is at least 10 times $R_m$.

22. An electrical device which comprises
    (1) a conductive polymer component which has been prepared by a method which comprises
        (a) melt-extruding a conductive polymer composition through a die to produce a hollow extrudate,
        (b) slitting the extrudate axially to form a sheet, and (c) dividing the sheet into a plurality of components; and (2) at least two electrodes which can be connected to a source of electrical power to cause current to flow through the component, wherein the component has a length p measures in the machine direction of extrusion where the machine direction is parallel to the direction of extrusion, a width w measured in the transverse direction at right angles to the direction of extrusion, and a thickness t, and if the component is divided in the machine direction into equal longitudinal segments, each segment having a width equal to the smaller of (a) 0.2w and (b) as close to 1 inch a division into equal segments will allow, the resistivity measured in the transverse direction of each longitudinal segment is from $0.7 R_t$ to $1.3 R_t$, where $R_t$ is the resistivity in the transverse direction of the component.

23. A device according to claim 22 wherein conductive polymeric component exhibits PTC behavior.

24. A device according to claim 23 wherein the device is a heater which has a surface area of at least 2 in$^2$.

25. A device according to claim 24 wherein the heater has a surface area of at least 5 in$^2$.

26. A device according to claim 24 wherein the conductive polymer composition has a resistivity of at least 100 ohm-cm.

27. A device according to claim 26 wherein the conductive polymer composition has a resistivity of at least 1000 ohm-cm.

28. A device according to claim 27 wherein the conductive polymer composition has a resistivity of at least 10,000 ohm-cm.

29. A device according to claim 22 wherein the device is a circuit protection device which has a surface area of less than 2 in$^2$.

30. A device according to claim 22 wherein the resistivity of the component in the normal direction, $R_n$, is at least 2 times the resistivity in the machine direction, $R_m$.

31. A device according to claim 30 wherein $R_n$ is at least 5 times $R_m$.

32. A device according to claim 31 wherein $R_n$ is at least 10 times $R_m$.

* * * * *